(12) United States Patent  (10) Patent No.: US 11,902,319 B2
Keohane et al.                     (45) Date of Patent: *Feb. 13, 2024

(54) DYNAMIC PROTECTION FROM DETECTED BRUTE FORCE ATTACK

(71) Applicant: International Business Machines Corporation, Armonk, NY (US)

(72) Inventors: Susann M. Keohane, Austin, TX (US); Gerald McBrearty, Austin, TX (US); Jessica Murillo, Round Rock, TX (US); Johnny Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/195,759

(22) Filed: Mar. 9, 2021

(65) Prior Publication Data

US 2021/0218768 A1    Jul. 15, 2021

Related U.S. Application Data

(63) Continuation of application No. 16/153,903, filed on Oct. 8, 2018, now Pat. No. 10,972,498.

(51) Int. Cl.
*H04L 9/40*    (2022.01)
*H04L 9/32*    (2006.01)
(Continued)

(52) U.S. Cl.
CPC ........ *H04L 63/1441* (2013.01); *G06F 21/316* (2013.01); *G06F 21/46* (2013.01); *H04L 9/3226* (2013.01)

(58) Field of Classification Search
CPC .............. H04L 63/1441; H04L 9/3226; H04L 63/1466; G06F 21/316; G06F 21/46; G06F 21/45; G06F 21/552; G06F 21/554
See application file for complete search history.

(56) References Cited

U.S. PATENT DOCUMENTS 5,991,882 A    11/1999    O'Connell
8,370,925 B2    2/2013    Childress
(Continued)

OTHER PUBLICATIONS

"Automate Password Reset & Unlock Accounts with ADS-SelfServicePlus", ManageEngine, 2018, 4 pps., https://www.manageengine.com/products/self-service-password/automatic-password-reset.html.
(Continued)

*Primary Examiner* — Beemnet W Dada
(74) *Attorney, Agent, or Firm* — Aaron Pontikos

(57) ABSTRACT

A computer-implemented process, computer program product, and system for dynamic change of a password under a brute force attack. A computer processor determines a quantity of consecutive unsuccessful attempts to access the targeted item protected by a password. Responsive to the quantity of consecutive unsuccessful attempts to access the targeted item exceeding a predefined threshold, the computer processor acquires a new password for access to the targeted item, wherein the new password is based on a more complex set of password generation rules than a current password. The computer processor changing the current password of the targeted item to the new password, and in response to changing the current password of the targeted item to the new password, the computer processor sends an encrypted message regarding the new password to a user associated with the targeted item.

18 Claims, 3 Drawing Sheets

(51) Int. Cl.
*G06F 21/31* (2013.01)
*G06F 21/46* (2013.01)

(56) References Cited

U.S. PATENT DOCUMENTS

| | | | |
|---|---|---|---|
| 8,819,810 B1 | 8/2014 | Liu | |
| 8,839,353 B2 | 9/2014 | Thom | |
| 8,850,519 B2 | 9/2014 | Osborn | |
| 8,904,506 B1 | 12/2014 | Canavor | |
| 8,973,113 B1* | 3/2015 | Eatough | H04L 63/08 726/6 |
| 9,521,127 B1* | 12/2016 | Childress | G06F 21/46 |
| 9,525,683 B2 | 12/2016 | Wall | |
| 9,635,011 B1* | 4/2017 | Wu | H04L 63/0807 |
| 10,362,055 B2 | 7/2019 | Kumar | |
| 2010/0325707 A1* | 12/2010 | Iverson | H04L 63/10 726/6 |
| 2012/0238207 A1 | 9/2012 | Marcovecchio | |
| 2014/0208386 A1 | 7/2014 | Sama | |
| 2014/0282978 A1 | 9/2014 | Lerner | |
| 2017/0126733 A1 | 5/2017 | Mathew | |
| 2017/0142160 A1 | 5/2017 | Nguyen-Huu | |
| 2017/0208075 A1 | 7/2017 | Kerametlian | |
| 2017/0346809 A1 | 11/2017 | Plotnik | |
| 2019/0132419 A1 | 5/2019 | Wang | |
| 2020/0137066 A1* | 4/2020 | Erickson | H04W 12/06 |
| 2020/0329025 A1* | 10/2020 | Kahn | H04L 9/3226 |

OTHER PUBLICATIONS

"Brute Forcing the Change Password Feature", Secure Ideas, Apr. 24, 2013, 7 pps., https://blog.secureideas.com/2013/04/brute-forcing-change-password-feature.html.

"Change passwords automatically when they expire", 2018, 11 pps., https://thycotic.com/products/secret-server/features/change-network-passwords/.

"Meet the One and Only Password Changer", Dashlane, 2018, 9 pps., https://www.dashlane.com/passwordchanger.

"Microsoft Security Advisory 3062591", Microsoft, May 1, 2015, https://technet.microsoft.com/en-us/library/security/3062591.aspx.

Autrel et al., "Reaction policy model based on dynamic organizations and threat context." IFIP Annual Conference on Data and Applications Security and Privacy, Springer Berlin Heidelberg, 2009, 15 pps.

Halderman et al., "A convenient method for securely managing passwords." Proceedings of the 14th international conference on World Wide Web, ACM, 2005, 9 pps.

Kim et al., "Designs of a secure wireless LAN access technique and an intrusion detection system for home network." Networked Computing and Advanced Information Management, 2008, vol. 1. IEEE, 2008, 17 pps.

Klosowski, "LastPass Can Now Automatically Change Your Passwords", Lifehacker, Dec. 9, 2014, 3 pps., http://lifehacker.com/lastpass-can-now-automatically-change-your-passwords-1668860126.

List of IBM Patents or Patent Applications Treated as Related, Appendix P, Filed Herewith, 2 pages.

Maunder, "Updates on CyberSecrity, WordPress and what we're cooking in the lab today", Wordfence, 2018, 16 pps., https://www.wordfence.com/blog/2016/02/wordpress-password-security/.

Paganini, "Short Password Reset Code vulnerability allows hackers to brute-force many websites", Aug. 19, 2013, 7 pps., http://securityaffairs.co/wordpress/17148/hacking/short-password-reset-code-vulnerability-allows-hackers-to-brute-force-many-websites.html.

Upadhyay et al., "A Framework based on Authentication and Authorization to ensure Secure Data Storage in Cloud" International Journal of Computer Applications (0975-8887) vol. 90—No. 15, Mar. 2014, 5 pps.

U.S. Appl. No. 16/153,903, filed Oct. 8, 2018.

* cited by examiner

DYNAMIC PROTECTION FROM DETECTED BRUTE FORCE ATTACK

FIELD OF THE INVENTION

The present invention relates generally to the field of access protection, and more particularly to dynamic password protection to brute force attacks.

BACKGROUND OF THE INVENTION

Access to digital resources, accounts, and devices are identified by usernames and are protected by user-selected passwords. As computing speed and capability advances, the likelihood of computer programs to systematically 'guess' at passwords to access a user's account or other resource has significantly improved, especially if multiple devices executing automatic programs are used to target access to a specific computer-based account.

Systematic computer attacks on computer accounts or devices are known as a brute force attack and utilizes rapidly applying permutations of words and characters to break into an account protected by a password. Success often depends on the amount of computing power to rapidly navigate through the permutations, and the amount of time available to access the target account, resource, or device. Increases in processor speed, number of processors per computer and use of multiple computing devices targeting the same password without intervention, significantly increases the probability of success.

SUMMARY

Embodiments of the present invention disclose a computer-implemented process, computer program product, and system for dynamic change of a password to access a targeted item, the computer-implemented process providing for a computer processor to monitor a targeted item protected by a password. The computer processor determines a quantity of consecutive unsuccessful attempts to access the targeted item protected by a password. Responsive to the quantity of consecutive unsuccessful attempts to access to the targeted item exceeding a predefined threshold, the computer processor acquires a new password for access to the targeted item, wherein the new password is based on a more complex set of password generation rules than a current password. The computer processor changing the current password of the targeted item to the new password, and in response to changing the current password of the targeted item to the new password, the computer processor sends an encrypted message regarding the new password to a user associated with the targeted item.

DETAILED DESCRIPTION

Figure 1:
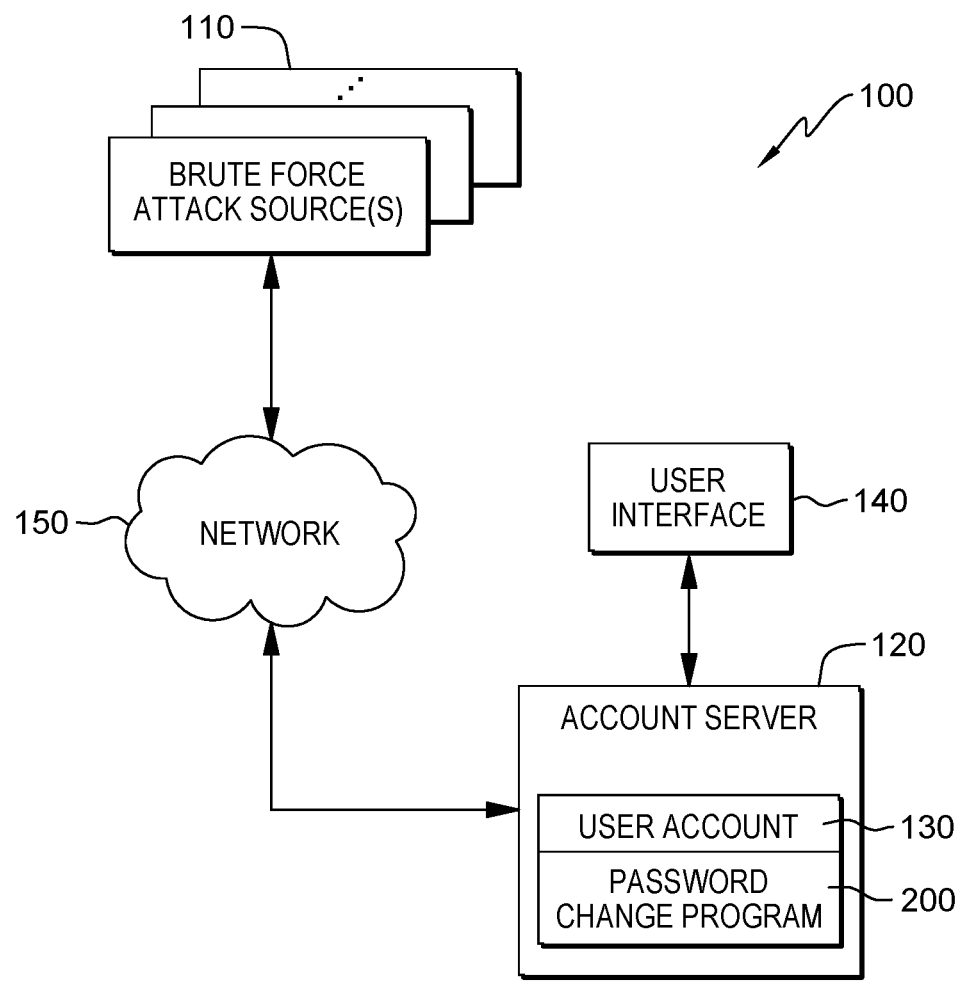
FIG. 1 is a functional block diagram illustrating a distributed workflow processing environment, in accordance with an embodiment of the present invention.

Embodiments of the present invention recognize that the growth of dependence on computer-accessible accounts, resources, and devices also includes increased risk of protecting unauthorized access. Computer-based hacking activity is pervasive and users relying on password protection face increasing odds that protection is broken by continual enhancements to computing power and techniques utilized by hackers. Embodiments of the present invention recognize that brute force computer attacks, in which computer programs, or scripts often referred to as "bots", are directed to a password protected account, resource, information source, or device, and systematically apply permutations of words or characters in order to break the password protection and gain login access.

Password protection relies on a length of characters of a password and use of upper, lower case, numbers, and special characters, to increase the difficulty of determining a particular password by systematic attacks. The use of powerful computing devices, or multiple devices directed to a particular instance of password protection greatly increases the likelihood of successfully discovering passwords. Additionally, users that may have dozens of passwords for various accounts, stored information, resources, and devices, may balance the practicality of being able to recall passwords with the increased protection of longer character strings for passwords, and as a result tend to keep password length at or towards minimum requirements.

Embodiments of the present invention provide a method, computer program product, and computer system for dynamically changing a password for access that is targeted by a brute force attack, systematically increasing the strength of the password as the brute force attack proceeds. Embodiments of the present invention detect the brute force attack by determining a frequency of access or login attempts that exceeds a pre-defined frequency threshold, and tracks the quantity of access or login attempts, changing the current password to a next-stronger password as the quantity of unsuccessful attempts exceeds an attempt threshold. In some embodiments, detection of whether multiple sources are participating in the brute force attack is based on whether multiple IP addresses attempting access to the account are determined during the brute force attack period. In some embodiments, a user may pre-define a set of progressively stronger passwords, generated to use as alternative passwords during a brute force attack. In other embodiments, progressively stronger passwords are dynamically generated to replace the current password.

Embodiments of the present invention change the password during a detected brute force attack subsequent to the quantity of consecutive unsuccessful access or login attempts exceeds an attempt threshold, effectively avoiding successful unauthorized access, and simultaneously increasing the strength of the password and the difficulty of success of the brute force attack. Hereafter, for brevity and clarity, attempts of entering passwords protecting access to online assets, or for account or device login will be referred to collectively as "account" access attempts, without limitations as to the asset protected by the password.

Embodiments of the present invention provide a secure notification to the user whose password is under brute force attack, indicating that the password has been changed. In some embodiments, the secure (e.g., encrypted) notification or message includes the new password. In other embodiments, the notification or message to the user may indicate the password has been changed and present a listing of alternate devices to which the new password may be sent via an encrypted message; the user selecting the alternate device of their choice.

In some embodiments of the present invention, a particular unsuccessful permutation previously applied by the brute force attack and detected, is selected as an alternate password that is not repeated by the brute force attack. In other embodiments, in response to continued brute force attack, subsequent to multiple changes to the password in which each change includes a password having a longer character length, the current password may be changed to a password having a significantly shorter character length than has been previously applied unsuccessfully by the brute force attack. In yet other embodiments, subsequent to a pre-determined number of password changes during a brute force attack, a physical action is applied to thwart the brute force attack, such as shutting down the computer, disconnecting the network connection, or locking (suspending) the account, file, information source, resource or device, respectively referred to hereafter by the single term of an/the account.

Embodiments of the present invention recognize the computer-related technology problem that, given sufficient computing power and time, brute force attacks on a user account will eventually determine the password of the account and gain unauthorized access. Embodiments of the present invention solve the problem by automatically changing the access password for the account once a brute force attack is detected, by tracking a quantity of consecutive unsuccessful access attempts towards exceeding a pre-determined access attempt threshold. Embodiments of the present invention automatically perform rapid security action without intervention by the account user and, as the detected brute force attack continues, dynamically responds, increasing the difficulty of brute force attack success. In response to exceeding the pre-determined access attempt threshold, a new password is acquired, and the current password is changed to the first new password, which includes an additional number of characters, strengthening the new password. If the brute force attack continues, the tracking of the consecutive unsuccessful access attempts restarts, and the process continues with acquiring another new password, changing to a second new password, replacing the first new password, in response to the quantity of consecutive unsuccessful access attempts again exceeding the pre-determined access attempt threshold. A user of the account is notified by encrypted message of the change of passwords, and the quantity of consecutive unsuccessful access attempts are reset to zero.

The present invention will now be described in detail with reference to the Figures. FIG. 1 is a functional block diagram illustrating a distributed network processing environment, generally designated 100, in accordance with an embodiment of the present invention. Distributed network processing environment 100 includes brute force attack source 110, account server 120, which hosts user account 130 and password change program 200, all interconnected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between brute force attack source(s) 110 and account server 120, in accordance with embodiments of the present invention.

Brute force attack source(s) 110 includes one or more computing devices configured to connect to network 150 and perform a brute force attack directed to gain access to a targeted user account. In some embodiments, brute force attack source(s) 110 is a multi-processor server computer, or a mainframe computer. In other embodiments, brute force attack source(s) 110 can be a laptop computer, a desktop computer, a tablet computer, a netbook computer, a personal computer (PC), a personal digital assistant (PDA), a smart phone, or any programmable electronic device capable of performing a brute force attack on a targeted account. In another embodiment, brute force attack source(s) 110 represents a computing system utilizing clustered computers and components (e.g., database server computers, application server computers, etc.) that act as a single pool of seamless resources when accessed within distributed network processing environment 100. Each device included in brute force attack source(s) 110 may include internal and external hardware components, as depicted and described in further detail with respect to FIG. 3.

Account server 120 is depicted as hosting user account 120 and password change program 200. Account server 120 is a computing device, or a collection of computing devices within a computing system configured to connect to network 150 and perform hosting and access functions of user account 130. Account server 120, in some embodiments, may be a database of secured information, or resources such as downloadable files or content. In other embodiments account server 120 may perform online purchasing, payment, or other transaction functions in which users hold personal accounts protected by passwords. In yet other embodiments, account server 120 may be a network connected device whose access is protected by a password. In some embodiments of the present invention, account server 120 can be a server computer, a blade computer, a laptop computer, a desktop computer, a tablet computer, a netbook computer, a personal computer (PC), a personal digital assistant (PDA), a smart phone, or any programmable electronic device capable of performing a brute force attack on a targeted account. In another embodiment, account server 120 represents a computing system utilizing clustered computers and components (e.g., database server computers, application server computers, etc.) that act as a single pool of seamless resources when accessed within distributed network processing environment 100. Account server 120 may include internal and external hardware components, as depicted and described in further detail with respect to FIG. 3.

User interface 140 provides an interface to account server 120, and password change program 200 hosted on account server 120, for a user of user account 130. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user and user account 130 hosted on account server 120. Mobile application software, or an "app," is a computer program designed to run on mobile computing devices. User interface 106 enables the user of user account 130 to access user account 130 and perform authorized transaction after authenticated access by entering a valid password.

Password change program 200 is depicted as hosted on account server 120. In some embodiments of the present invention, password change program 200 works in conjunction with access validation functions associated with user account 130 as a plugin to existing validation functions. In other embodiments, password change program 200 operates as a separate application accessible to access login attempts directed to user account 130. In yet other embodiments, all access attempts are received by password change program 200 to determine whether a brute force attack is attempted, prior to subsequently transmitting access attempts to existing validation functions associated with user account 130.

In embodiments of the present invention, password change program 200 monitors access attempts for one or more accounts that are each protected by a respective password. Password change program 200 determines a frequency of account access attempts by determining a quantity of access attempts within a pre-determined period of time. For example, password change program 200 detects 500 access attempts in 30 seconds and determines a frequency of access attempts of 1000 per minute. Password change program 200 compares the determined frequency of access attempts to a first pre-defined threshold that indicates a brute force attack. In some embodiments the first pre-defined threshold is set to exceed the quantity of access attempts that a human could perform within a brief period of time, such as a minute, for example. If a human could perform 10 access attempts within a one minute period, a first pre-defined threshold may be set at 100 attempts per minute as a threshold frequency of access attempts, for example. Password change program 200 determines if the detected frequency of access attempts exceeds the first pre-defined threshold and, in response to the detected frequency of access attempts exceeding the first pre-defined threshold, determines that a brute force attack on the targeted account exists.

In some embodiments of the present invention, password change program 200 detects whether a brute force attack is a combinational brute force attack, involving multiple computing devices directing brute force attack for access to the same target account. Combinational brute force attacks can significantly increase the probability of success by covering more potential permutations of a password in less time. For example, one attacking device may apply permutations of passwords that are 6 characters in length, whereas another device may begin permutations of passwords that are 8 characters in length, etc. Password change program 200 detects combinational brute force attacks by determining the Internet Protocol (IP) address of the attacking device and detecting multiple IP addresses during the same brute force attack. In some embodiments of the present invention, password change program 200 may apply an adjusted second pre-defined threshold at which a new password is acquired, and the current password is changed to the new password which offers stronger password protection by following a more complex set of password generation rules than the current password.

Password change program 200 determines the quantity of consecutive, unsuccessful access attempts made and compares the quantity to a second pre-defined threshold, and if the quantity of consecutive unsuccessful access attempts exceeds the second pre-defined threshold, password change program 200 acquires a new password. In some embodiments of the present invention, the new password is acquired from a set of passwords pre-defined by the user. Each subsequent password of the set of passwords includes a longer character length and follows a more complex set of password generation rules than its previous password. In other embodiments, password change program 200 dynamically generates the new password, which again follows a more complex set of password generation rules than the previous password. In some embodiments, the more complex set of password generation rules are pre-defined and can be changed by the account user, or a designated administrator of account security.

Password change program 200 changes the current password under brute force attack to the acquired new password. In some embodiments of the present invention, the new password includes a longer character length as compared to the current password, strengthening the protection of access to the account. In other embodiments, the new password meets a more complex set of password generation rules that includes criteria other than a longer minimum number of characters, such as use of upper/lower case letters, numbers, and special characters. Password change program 200 sends an encrypted message to the user of the account informing the user of the change of passwords and resets the count of consecutive unsuccessful access attempts to zero and continues to determine the quantity of consecutive unsuccessful access attempts made against the alternate password.

In some embodiments of the present invention, a set of alternate passwords is pre-defined by the user, and each subsequent password of the set of passwords meets the criteria of a more complex set of rules, such as having longer character length. In other embodiments, the alternate password is generated dynamically by password change program 200, also based on a set of rules increasing the strength of each subsequent password. In some embodiments, additional rules may be applied in which each subsequent password of the set of passwords, pre-defined by the user or dynamically generated, requires one or more upper case letters, lower case letters, numbers, and special characters, or other rules. In some embodiments, subsequent to multiple changes of the account password, password change program 200 takes a physical action to thwart the brute force attack.

Figure 2:
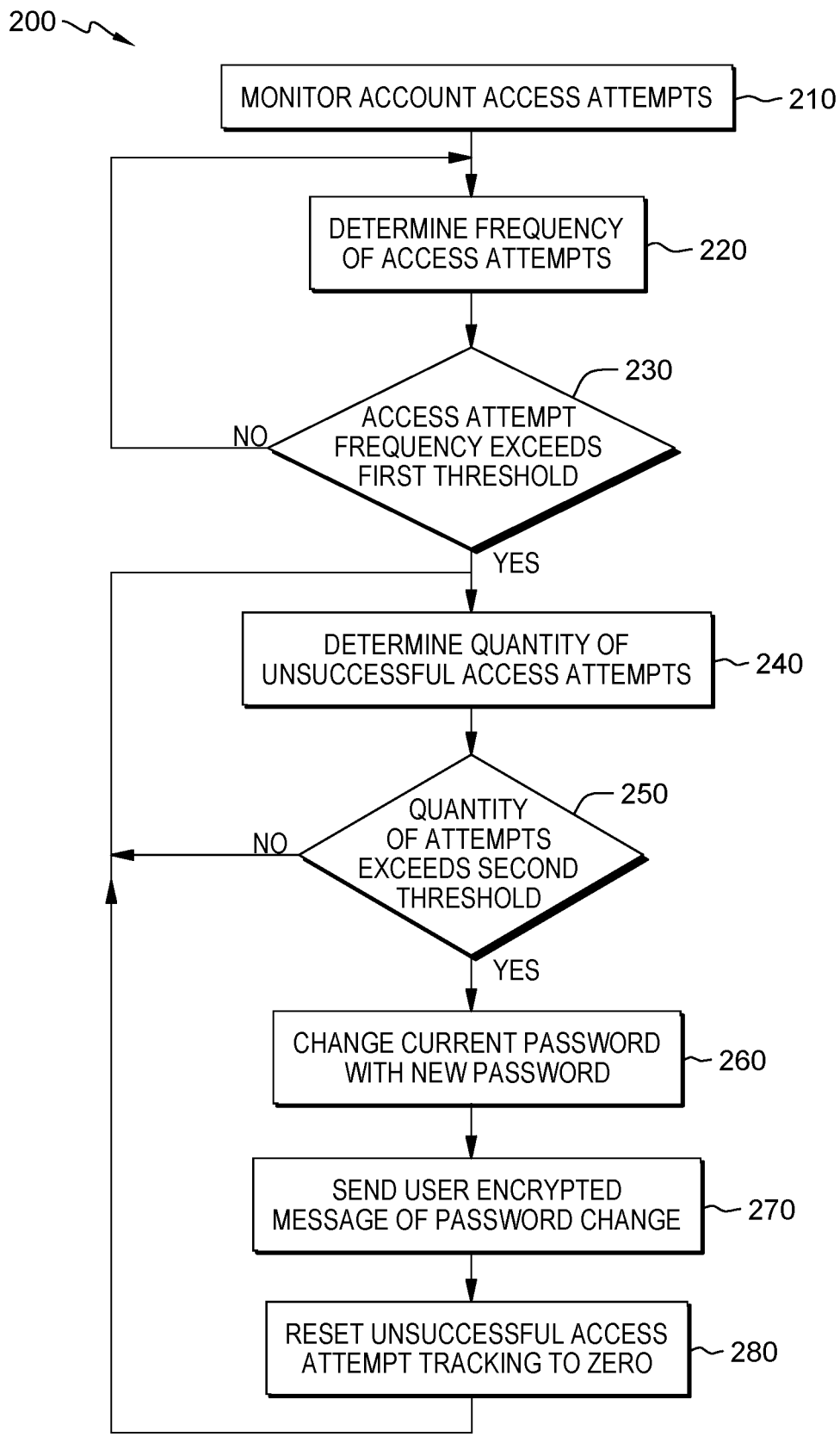
FIG. 2 illustrates operational steps of a password change program, operating within the distributed data processing environment of FIG. 1, in accordance with an embodiment of the present invention.

In some embodiments, subsequent to multiple changes of the account password due to a continuing brute force attack, password change program 200 initiates a physical action to thwart the brute force attack. Physical actions to thwart a persistent brute force attack include actions such as shutting down the computer, disconnecting the network connection, or locking (e.g., suspending) the account, file, information source, resource or device, hereafter collectively referred to as an/the account FIG. 2 illustrates operational steps of password change program 200, working in conjunction with account access validation functions for account 130 hosted on account server 120 within distributed network processing environment 100 of FIG. 1, in accordance with an embodiment of the present invention.

Password change program 200 monitors access attempts of accounts (step 210). Password change program 200, working in conjunction with existing account access validation functions, monitors access attempts to user accounts. Monitoring access attempts includes tracking the access attempts for an account and in some embodiments, includes determining the IP address from which the access attempt originates. In some embodiments, password change program 200 determines whether attempted access originates from multiple IP addresses within a pre-determined period of time.

For example, password change program 200, working in conjunction with account access validation functions existing on account server 120, monitors access attempts to user account 130. Password change program 200 tracks the quantity of access attempts made to user account 130 within a pre-determined period of time, for instance, within a 10 minute period. Password change program 200 detects the IP address from which an access attempt to user account 130 originates and determines whether multiple IP addresses are attempting access to user account 130 within a pre-determined period of time, such as within 1 minute or less of each other.

During monitoring of access attempts of an account, password change program 200 determines a frequency of access attempts directed to the account (step 220). Password change program 200 determines the quantity of access attempts made to an account within a pre-determined period of time and determines a frequency of access attempts. The quantity of access attempts made to the account is applied to a period of time beginning at the initial detection of an attempt to access the account and extends to the pre-determined period of time. Password change program 200 generates a frequency of access attempts made to the account.

For example, password change program 200 detects access attempts made to user account 130 on account server 120 and tracks the quantity of access attempts to be 500 attempts within a pre-determined time period of 30 seconds. Password change program generates an account access frequency of 1000 attempts per minute.

Having determined an access attempt frequency for the account, password change program 200 determines whether the frequency of access attempts exceeds a first threshold that is pre-defined (decision step 230). In response to determining that the frequency of access attempts made to the account is less than the first threshold (decision step 230, "NO" branch), password change program 200 returns to step 220 and continues to determine a frequency of access attempts made to the account. For the case in which password change program 200 determines that the frequency of access attempts made to the account exceeds the first threshold (decision step 230, "YES" branch), password change program 200 identifies the access attempts as a brute force attack and proceeds to determines a quantity of unsuccessful attempts made to the account (step 240). In some embodiments of the present invention, password change program 200 detects whether the access attempts made to the account that constitute the determined access attempt frequency, exceeding the first pre-defined threshold, are from multiple IP addresses. Confirming multiple IP addresses, password change program 200 determines that the brute force attack is a combinational attack from multiple sources.

For example, password change program 200 determines that the access attempt frequency of attempts to access to user account 130, determined to be 1000 attempts per minute, exceeds the first pre-defined threshold which is set at 20 attempts per minute. Password change program 200 identifies the access attempts as a brute force attack on user account 130 and proceeds to determine the quantity of consecutive, unsuccessful access attempts made to user account 130 by tracking the quantity of unsuccessful attempts. In some embodiments, password change program 200 detects that the access attempts comprising the frequency of access attempts directed to user account 130 are from multiple IP addresses, indicating a combinational brute force attack on user account 130.

As password change program 200 tracks the consecutive, unsuccessful access attempts, determining the quantity of unsuccessful access attempts, password change program 200 determines whether the quantity of unsuccessful access attempts exceeds a second pre-defined threshold (decision step 250). For the case in which password change program 200 determines that the quantity of access attempts does not exceed the second pre-defined threshold, password change program 200 returns to step 240 and continues to quantify the number of consecutive, unsuccessful access attempts (decision step 250, "NO" branch). For the case in which password change program 200 determines that the quantity of consecutive, unsuccessful access attempts exceeds the second pre-defined threshold (step 250, "YES" branch), password change program 200 acquires a new password and changes the current password with the acquired new password (step 260).

In some embodiments of the present invention, password change program 200 acquires the new password from a set of pre-defined passwords, selecting a next password in the set of passwords subsequent to the current password. In some embodiments, the set of pre-defined passwords is generated by the user of the account. Each password of the set of passwords includes a longer character length and follows a more complex set of password generation rules than the previous password, such as the number and requirements for uppercase and lowercase letters, numbers, and special characters. In some embodiments, after a series of progressively longer passwords, the set of passwords may revert to a shorter password, to thwart a persistent brute force attack that has continued to attempt access with progressively longer password attempts.

In some embodiments, password change program 200 acquires the new password by dynamically generating the new password and applying a longer character length and a more complex set of password generations rules than that of the current password. Having acquired the new password, password change program 200 changes the current password to the acquired new password.

For example, password change program 200 determines the quantity of consecutive, unsuccessful access attempts of 3001 to exceed the second pre-defined threshold of 3000 access attempts and acquires a new password by selecting the next password of the set of passwords that are pre-defined by the user of the account.

In step 260, password change program 200 replaces the current password with a new password that includes a longer character string and in some embodiments of the present invention, may meet additional and more complex rules. In some embodiments the new password is from a set of sequentially more complex passwords pre-determined by the user and sequentially applied by password change program 200. In other embodiments, password change program 200 dynamically generates the new password to include a longer character string that the previous password and may meet additional and more complex rules.

For example, password change program 200 replaces the current eight-character password with a new twelve-character password. In some embodiments, the twelve-character password is pre-defined by the user and is included in a set of passwords in which each subsequent password includes a longer character string than the previous password of the set, such as an eight-character password, a twelve-character password, a fourteen-character password, and a sixteen-character password; each offering stronger password protection. In some embodiments, each password of the set is sequentially more complex than the previous password, and may meet additional and more complex rules, such as a specified number of upper case and/or lower-case letters, a specified number of numerals, a specified number of special characters, and/or a specified combination of two or more of: upper case, lower case, numbers, and special characters. In other embodiments, the new password is dynamically generated by password change program 200, such that the new password length is greater than the replaced current password, and the new password may also meet additional and more complex rules.

Having changed the current password with the new password, password change program 200 sends an encrypted message of the password change to the user (step 270). The message regarding the password change is encrypted and may be further secured by additional validation steps prior to revealing the new password to the user. In some embodiments, password change program 200 initially notifies the user that a new password has been put in place for the user's account. The notification may be an email, a text message, a voice mail, or may be posted at a pre-determined secure online access point. In some embodiments, the notification may provide the user an option of how they wish to receive a secure message that includes the new password. The user may select the option of choice, which may include a particular device and type of message from which they choose to receive the new password. In some embodiments of the present invention, based on the frequency of access attempts and whether the brute force attack is a combinational attack, password change program 200 may delay sending the password change message in lieu of anticipating an additional password change during the current brute force attack on the account.

For example, subsequent to changing the user account password from the current password to the new password, password change program 200 sends an encrypted message to the user indicating that the password for the user account 130 has been changed by password change program 200. In some embodiments the message may indicate that the password change is a result of detecting a brute force attack. In some embodiments the message provides options to the user as to how they wish to receive the new password. The user selects the preferred option, which may include a choice of device on which to receive the new password, such as a particular smart phone, tablet, laptop computer, desktop computer, or smart watch. The options provided to the user may include choice of the type of message used to provide the new password, such as an email to a particular email address, a text message, a voice message or a file that can be downloaded from a secure site. In some embodiments, the receipt of the new password includes additional user validation actions, such as answering questions or providing additional identification credentials.

Having changed the password and having sent the new password to the user of the account, password change program 200 resets the consecutive unsuccessful access attempt quantity being tracked to zero (step 280). The quantity of unsuccessful access attempts is reset to zero subsequent to changing the password of the account to the new password, allowing password change program 200 to track the unsuccessful access attempts of the brute force attack (loop to step 240), towards the second pre-defined threshold (decision step 250), as the brute force attack continues.

Figure 3:
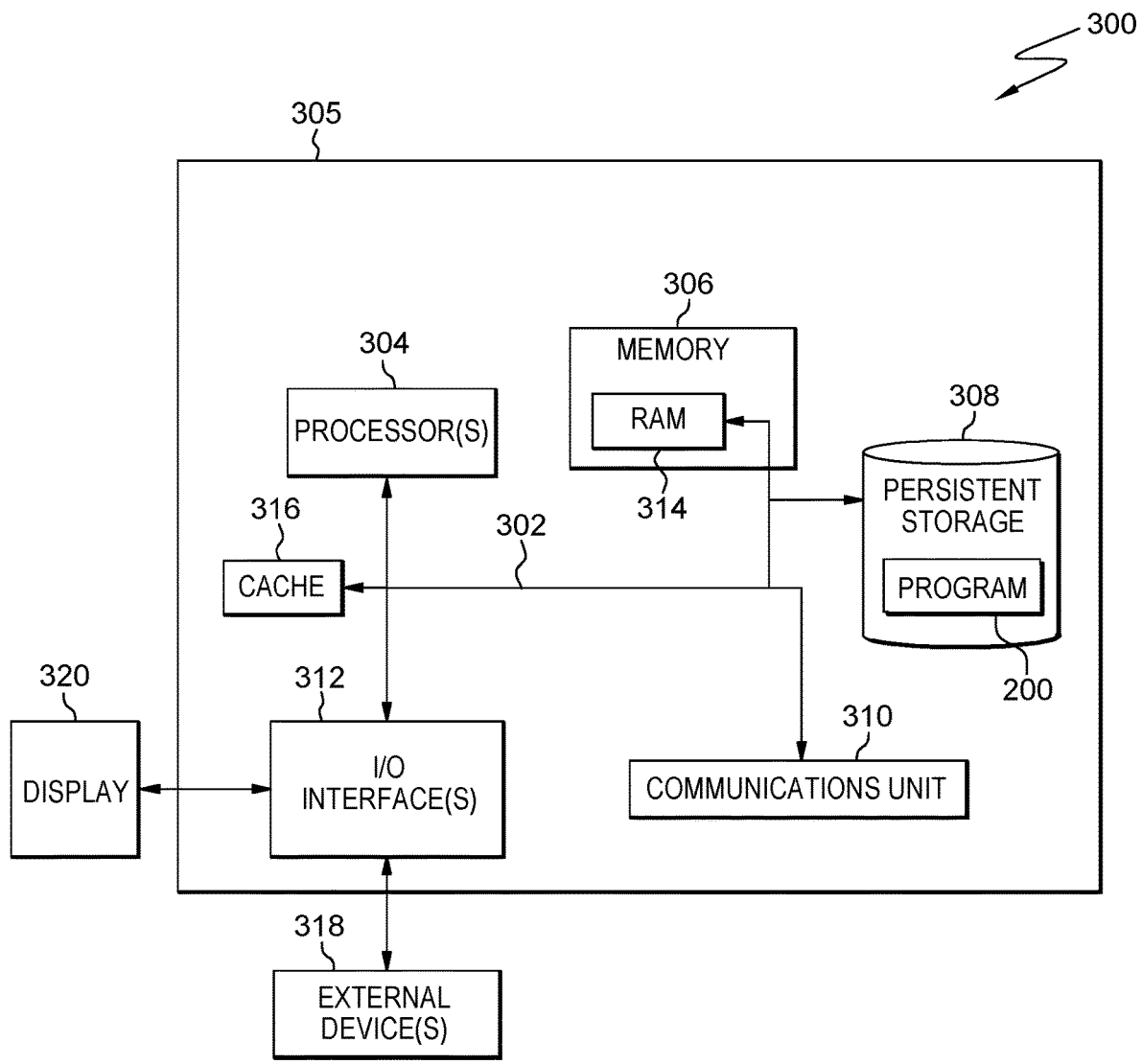
FIG. 3 depicts a block diagram of components of a computing system, such as a server computer or smart device, capable of operationally performing the password change program, in accordance with an embodiment of the present invention.

FIG. 3 depicts a block diagram of components of computing system 300, which includes computing device 305. Computing device 305 includes components and functional capability similar to one or more of brute force attack source(s) 110, and account server 120 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306, cache memory 316, and persistent storage 308 are computer readable storage media. In this embodiment, memory 306 includes random access memory (RAM) 314. In general, memory 306 can include any suitable volatile or non-volatile computer readable storage media.

Password change program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of distributed workflow processing environment 100, and devices of environments connected to network 150. In these examples, communications unit 310 includes one or more network interface cards. Communications unit 310 may provide communications through the use of either or both physical and wireless communications links. Password change program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., password change program 200 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   a computer processor determining a quantity of consecutive unsuccessful attempts to access a targeted item protected by a current password;
   responsive to the quantity of consecutive unsuccessful attempts to access the targeted item exceeding a predefined threshold, the computer processor selecting a new password in a sequential order from a set of new passwords, wherein a length of the selected new password exceeds a length of a previous new password and the selected new password is based on a more complex set of password generation rules than the current password;
   the computer processor changing the current password of the targeted item to the new password; and
   the computer processor sending an encrypted message regarding the new password to a user associated with the targeted item.

2. The computer-implemented method of claim 1, wherein responsive to the computer processor changing the current password of the targeted item to the new password, the computer processor resetting a count of the quantity of consecutive unsuccessful attempts to access the targeted item.

3. The computer-implemented method of claim 1, wherein the computer processor determines a brute force password attack on the targeted item, based on the computer processor detecting a frequency of access attempts exceeding a pre-determined quantity of access attempts within a predetermined period of time.

4. The computer-implemented method of claim 1, wherein the computer processors determines a brute force password attack on the targeted item, based on the first predefined threshold of a frequency of account access attempts of one or more access attempts within three minutes continuing over a period of at least one hour.

5. The computer-implemented method of claim 1, wherein the more complex set of password generation rules for the new password includes changing a quantity of special characters and numbers.

6. The computer-implemented method of claim 1, further comprising:
   the computer processor determining whether access attempts to the targeted item originate from multiple Internet Protocol (IP) addresses;
   responsive to determining the access attempts to the targeted item originate from multiple IP addresses, the computer processor determining the brute force password attack on the targeted item to be a combinatorial attach of multiple sources; and
   the computer processor applying an adjusted second predefined threshold at which a new password is acquired, based on detection of attacks and the current password is changed to the new password which offers stronger password protection by following a more complex set of password generation rules than the current password.

7. The computer-implemented method of claim 1, wherein sending the encrypted message regarding the new password to the user of the targeted item, further comprises:
   the computer processor including an option for the user to select a device on which to receive the new password of the targeted item and an option for the user to select a type of message in which the new password is included.

8. The computer-implemented method of claim 1, further comprising:
   in response to reaching a predetermined number of password changes during a brute force attack, the computer processor locking access to the targeted item.

9. The computer-implemented method of claim 1, further comprising:
   the computer processor determining whether the brute force attack continues subsequent to a pre-determined number of password changes having progressively greater character length; and
   in response to determining the brute force attack continues subsequent to a predetermined number of password changes having progressively greater character length, the computer processor reverting to a password having a shorter character length.

10. A computer program product comprising: the computer-implemented process comprising:
    one or more computer readable storage media wherein the computer readable storage medium is not a transitory signal per se, and program instructions stored on the one or more computer readable storage media, the program instructions comprising:
    program instructions to determine a quantity of consecutive unsuccessful attempts to access a targeted item protected by a current password;
    responsive to the quantity of consecutive unsuccessful attempts to access the targeted item exceeding a predefined threshold, program instructions to select a new password in a sequential order from a set of new passwords, wherein a length of the selected new password exceeds a length of a previous new password and the selected new password is based on a more complex set of password generation rules than the current password;
    program instructions to change the current password of the targeted item to the new password; and
    program instructions to send an encrypted message regarding the new password to a user associated with the targeted item.

11. The computer program product of claim 10, wherein responsive to the computer program instructions to change the current password of the targeted item to the new password, program instructions to reset a count of the quantity of consecutive unsuccessful attempts to access the targeted item.

12. The computer program product of claim 10, wherein the computer processor determines a brute force password attack on the targeted item, based on the computer processor detecting a frequency of access attempts exceeding a pre-determined quantity of access attempts within a predetermined period of time.

13. The computer program product of claim 10, wherein the more complex set of password generation rules for the new password includes changing a quantity of special characters and numbers.

14. A computer system for dynamic change of a password to access an account, the computer-implemented process comprising:
    one or more computer processors, one or more computer readable storage media, program instructions stored on the computer readable storage media for execution by at least one of the one or more processors, the program instructions comprising:
    program instructions to determine a quantity of consecutive unsuccessful attempts to access a targeted item protected by a current password;

responsive to the quantity of consecutive unsuccessful attempts to access the targeted item exceeding a predefined threshold, program instructions to select a new password in a sequential order from a set of new passwords, wherein a length of the selected new password exceeds a length of a previous new password and the selected new password is based on a more complex set of password generation rules than the current password;

program instructions to change the current password of the targeted item to the new password; and program instructions to send an encrypted message regarding the new password to a user associated with the targeted item.

15. The computer system of claim 14, further comprising:

program instructions to determine whether the brute force attack continues subsequent to a pre-determined number of password changes having progressively greater character length; and in response to determining the brute force attack continues subsequent to a predetermined number of password changes having progressively greater character length, program instructions to revert to a password having a shorter character length.

16. The computer system of claim 14, wherein the program instructions to send the encrypted message regarding the new password to the user of the targeted item, further comprises:

program instructions to include an option for the user to select a device on which to receive the new password of the targeted item and an option for the user to select a type of message in which the new password is included.

17. The computer system of claim 14, further comprising:

program instructions to determine whether access attempts to the targeted item originate from multiple Internet Protocol (IP) addresses;

responsive to determining the access attempts to the targeted item originate from multiple IP addresses, program instructions to determine the brute force password attack on the targeted item to be a combinatorial attach of multiple sources;

program instructions to apply an adjusted second predefined threshold at which a new password is acquired; and program instructions to change the current password to a new password of greater length and more complex set of rules than the current password.

18. The computer system of claim 14, further comprising:

in response to reaching a predetermined number of password changes during a brute force attack, program instructions to lock access to the targeted item.

* * * * *